US009832712B2

(12) United States Patent
Fukuta et al.

(10) Patent No.: US 9,832,712 B2
(45) Date of Patent: Nov. 28, 2017

(54) USER TERMINAL AND NETWORK APPARATUS

(71) Applicant: KYOCERA CORPORATION, Kyoto (JP)

(72) Inventors: Noriyoshi Fukuta, Yokohama (JP); Fangwei Tong, Machida (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/024,256

(22) PCT Filed: Sep. 10, 2014

(86) PCT No.: PCT/JP2014/073870
§ 371 (c)(1),
(2) Date: Mar. 23, 2016

(87) PCT Pub. No.: WO2015/045860
PCT Pub. Date: Apr. 2, 2015

(65) Prior Publication Data
US 2016/0219499 A1    Jul. 28, 2016

(30) Foreign Application Priority Data

Sep. 27, 2013  (JP) .................................. 2013-202765

(51) Int. Cl.
*H04W 4/00*    (2009.01)
*H04W 48/16*   (2009.01)
(Continued)

(52) U.S. Cl.
CPC ........... *H04W 48/16* (2013.01); *H04W 4/005* (2013.01); *H04W 4/02* (2013.01); *H04W 8/005* (2013.01);
(Continued)

(58) Field of Classification Search
CPC ....... H04W 4/0005; H04W 8/26; H04W 4/00; H04W 12/06; H04W 36/08; H04W 4/08;
(Continued)

(56) References Cited

U.S. PATENT DOCUMENTS

| 8,977,276 | B2* | 3/2015 | Koskela | .............. | H04W 76/023 |
| | | | | | 455/450 |
| 9,036,546 | B2* | 5/2015 | Kwon | .................. | H04W 8/005 |
| | | | | | 370/255 |

(Continued)

FOREIGN PATENT DOCUMENTS

| JP | 2013-527697 A | | 6/2013 | | |
| KR | 20140125796 A | * | 10/2014 | ......... | H04W 76/023 |

(Continued)

OTHER PUBLICATIONS

International Search Report issued in PCT/JP2014/073870; dated Nov. 25, 2014.
(Continued)

*Primary Examiner* — Mahendra Patel
(74) *Attorney, Agent, or Firm* — Studebaker & Brackett PC (57) ABSTRACT

A user terminal according to the present invention is a user terminal in a mobile communication system that supports D2D communication that is direct device-to-device communication. The user terminal comprises: a receiver configured to receive, from a network device, D2D terminal information on another user terminal located around the user terminal, the network apparatus managing a location of the another user terminal that distributes information by the D2D communication; and a controller configured to perform control for discovering the another user terminal, on the basis of the D2D terminal information.

9 Claims, 6 Drawing Sheets

(51) Int. Cl.
*H04W 4/02* (2009.01)
*H04W 8/00* (2009.01)
*H04W 48/20* (2009.01)
*H04W 76/02* (2009.01)
*H04W 92/18* (2009.01)

(52) U.S. Cl.
CPC ......... *H04W 48/20* (2013.01); *H04W 76/023* (2013.01); *H04W 92/18* (2013.01)

(58) Field of Classification Search
CPC ..... H04W 88/08; H04W 92/18; H04W 4/005; H04W 8/186; H04W 72/0486; H04W 52/383; H04W 52/343; H04W 76/023; H04W 48/16; H04W 4/02; H04W 8/005; H04W 48/20; H04L 61/2069; H04L 67/1061
USPC ........ 455/434, 417, 517; 370/445, 319, 341, 370/353
See application file for complete search history.

(56) References Cited

U.S. PATENT DOCUMENTS

| | | | | |
|---|---|---|---|---|
| 9,094,050 | B2* | 7/2015 | Blankenship | H04B 5/0031 |
| 9,237,590 | B2* | 1/2016 | Novak | H04W 8/08 |
| 9,433,025 | B2* | 8/2016 | Lee | H04W 76/023 |
| 9,462,622 | B2* | 10/2016 | Jang | H04W 76/023 |
| 2010/0128701 | A1* | 5/2010 | Nagaraja | H04W 76/02 |
| | | | | 370/338 |
| 2010/0261469 | A1* | 10/2010 | Ribeiro | H04W 99/00 |
| | | | | 455/423 |
| 2011/0258313 | A1 | 10/2011 | Mallik et al. | |
| 2012/0115518 | A1* | 5/2012 | Zeira | H04W 8/005 |
| | | | | 455/500 |
| 2012/0163235 | A1* | 6/2012 | Ho | H04W 76/023 |
| | | | | 370/254 |
| 2012/0243431 | A1* | 9/2012 | Chen | H04W 72/0406 |
| | | | | 370/252 |
| 2013/0040680 | A1* | 2/2013 | Kim | H04W 4/005 |
| | | | | 455/509 |
| 2013/0073671 | A1* | 3/2013 | Nagpal | H04W 76/023 |
| | | | | 709/217 |
| 2013/0124937 | A1* | 5/2013 | Kim | H04L 1/1867 |
| | | | | 714/748 |
| 2013/0156190 | A1* | 6/2013 | Selen | H04W 4/02 |
| | | | | 380/270 |
| 2013/0157676 | A1* | 6/2013 | Baek | H04W 72/0486 |
| | | | | 455/452.1 |
| 2013/0242866 | A1* | 9/2013 | Lin | H04W 76/023 |
| | | | | 370/328 |
| 2013/0244661 | A1* | 9/2013 | Lin | H04W 76/023 |
| | | | | 455/436 |
| 2014/0122607 | A1* | 5/2014 | Fodor | H04W 76/023 |
| | | | | 709/204 |
| 2014/0204847 | A1* | 7/2014 | Belleschi | H04W 76/023 |
| | | | | 370/329 |
| 2014/0226504 | A1* | 8/2014 | Tavildar | H04W 72/082 |
| | | | | 370/252 |
| 2014/0233547 | A1* | 8/2014 | Vallabhu | G06F 9/44 |
| | | | | 370/338 |
| 2014/0247802 | A1* | 9/2014 | Wijting | H04W 76/023 |
| | | | | 370/329 |

FOREIGN PATENT DOCUMENTS

| | | | | |
|---|---|---|---|---|
| SE | EP 2898735 A1 * | 7/2015 | ......... | H04W 52/383 |
| WO | 2012/060934 A2 | 5/2012 | | |
| WO | 2012/088470 A1 | 6/2012 | | |
| WO | WO 2012088470 A1 * | 6/2012 | ......... | H04W 76/023 |

OTHER PUBLICATIONS

Written Opinion issued in PCT/JP2014/073870; dated Nov. 25, 2014.
3rd Generation Partnership Project; Technical Specification Group Services and System Aspects; Feasibility study for Proximity Services (ProSe); 3GPP TR 22.803; V12.1.0; Mar. 2013; pp. 1-45; Release 12; 3GPP Organizational Partners.
Communication pursuant to Rule 164(1) EPC issued by the European Patent Office dated Apr. 24, 2017, which corresponds to European Patent Application No. 14847519.7-1853 and is related to U.S. Appl. No. 15/002,425.
Samsung; "E-UTRAN Discovery Model"; 3GPP SA WG2 Meeting #96; S2-130908; Apr. 4-8, 2013; pp. 1-4; San Diego, CA, USA.
HTC; "Network Assisted ProSe discovery"; 3GPP WG2 Meeting #99; S2-133294; Sep. 23-27, 2013; pp. 1-4; Xiamen, P.R.China.

* cited by examiner

| TERMINAL ID1 | CONNECTION CELL ID | LOCATION INFORMATION (OPTION, ONLY D2D-DEDICATED FIXED TERMINAL) | D2D BEING PERFORMING INFORMATION (OPTION) |
|---|---|---|---|
| TERMINAL ID2 | CONNECTION CELL ID | LOCATION INFORMATION (OPTION, ONLY D2D-DEDICATED FIXED TERMINAL) | D2D BEING PERFORMING INFORMATION (OPTION) |
| ... | ... | ... | ... |
| | | | |

USER TERMINAL AND NETWORK APPARATUS

TECHNICAL FIELD

The present invention relates to a user terminal and a network apparatus in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see non-patent document 1).

In the D2D communication, a plurality of adjacent user terminals perform direct device-to-device communication without passing through a core network. On the other hand, in cellular communication which is normal communication in a mobile communication system, a user terminal makes communication through a core network.

It is noted that the user terminal performs control to discover a partner terminal of the D2D communication. As an example, the user terminal performs control to receive a discovery signal (Discovery signal or Discoverable signal) transmitted from another user terminal.

PRIOR ART DOCUMENT

Non-Patent Document

Non Patent Document 1: 3GPP technical report "TR 22.803 V12.1.0" June, 2013

SUMMARY OF THE INVENTION

However, another user terminal capable of performing the D2D communication may not necessarily present around the user terminal. Thus, when performing the control to discover the partner terminal of the D2D communication, the user terminal cannot discover the other user terminal if the other user terminal is not present around the user terminal. Therefore, the user terminal may wastefully consume the battery by performing the control to discover the partner terminal of the D2D communication.

Therefore, an object of the present invention is to provide a user terminal and a network apparatus, with which it is possible to restrain wasteful battery consumption in D2D communication.

A user terminal according to an embodiment is a user terminal in a mobile communication system that supports D2D communication that is direct device-to-device communication. The user terminal comprises: a receiver configured to receive, from a network device, D2D terminal information on another user terminal located around the user terminal, the network apparatus managing a location of the another user terminal that distributes information by the D2D communication; and a controller configured to perform control for discovering the another user terminal, on the basis of the D2D terminal information.

DESCRIPTION OF THE EMBODIMENT

[Overview of Embodiments]

A user terminal according to an embodiment is a user terminal in a mobile communication system that supports D2D communication that is direct device-to-device communication. The user terminal comprises: a receiver configured to receive, from a network device, D2D terminal information on another user terminal located around the user terminal, the network apparatus managing a location of the another user terminal that distributes information by the D2D communication; and a controller configured to perform control for discovering the another user terminal, on the basis of the D2D terminal information.

The user terminal according to the embodiment further comprises a transmitter configured to transmit a terminal information request for requesting the D2D terminal information, to the network apparatus.

In the user terminal according to the embodiment, the transmitter transmits the terminal information request to the network apparatus when the user terminal comes close to a location where the user terminal performed the D2D communication in the past.

The user terminal according to the embodiment further comprises: a transmitter configured to transmit, before the receiver receives the D2D terminal information, D2D capability information indicating that the user terminal is capable of performing the D2D communication, to the network apparatus.

In the user terminal according to the embodiment, the D2D capability information includes information for designating a frequency band in which the user terminal is capable of performing the D2D communication.

In the user terminal according to the embodiment, after determining that the controller performs the control for discovering the another user terminal, the receiver receives, from the network apparatus, discovery signal information on a discovery signal transmitted by the another user terminal so as to be discovered as a partner terminal of the D2D communication. The controller performs, as the control for discovering the another user terminal, control for receiving the discovery signal on the basis of the discovery signal information.

The user terminal according to the embodiment further comprises a transmitter configured to transmit, after receiving the D2D terminal information, a discovery information request for requesting the discovery signal information, to the network apparatus.

In the user terminal according to the embodiment, the discovery signal information includes information indicating a timing at which the another user terminal transmits the discovery signal and/or information on a radio resource used for transmitting the discovery signal of the another user terminal.

A network apparatus according to the embodiment is a network apparatus in a mobile communication system that supports D2D communication that is direct device-to-device communication. The network apparatus comprises: a controller configured to manage a location of another user terminal that distributes information by the D2D communication; and a transmitter configured to transmit, when the user terminal is located around the another user terminal, to the user terminal, D2D terminal information on the another user terminal located around the user terminal.

The network apparatus according to the embodiment further comprises: a receiver configured to receive, from the user terminal, a terminal information request for requesting the D2D terminal information. The transmitter transmits the D2D terminal information to the user terminal, in response to reception of the terminal information request.

The network apparatus according to the embodiment further comprises: a receiver configured to receive, from the user terminal, D2D capability information indicating that the D2D communication is possible. The transmitter transmits the D2D terminal information to the user terminal only when the D2D capability information is received from the user terminal.

In the network apparatus according to the embodiment, when the D2D capability information includes information for designating a frequency band in which the user terminal is capable of performing the D2D communication, the transmitter transmit, to the user terminal, the D2D terminal information on only the another user terminal capable of performing the D2D communication by use of the frequency band designated by the information.

In the network apparatus according to the embodiment, when a location of the another user terminal is fixed, the transmitter transmits, to the user terminal, the D2D terminal information on the another user terminal fixed.

In the network apparatus according to the embodiment, the transmitter transmits, after transmitting the D2D terminal information, to the user terminal, discovery signal information on a discovery signal transmitted by the another user terminal so as to be discovered as a partner terminal of the D2D communication.

The network apparatus according to the embodiment further comprises: a receiver configured to receive, after transmitting the D2D terminal information, from the user terminal, a discovery information request for requesting the discovery signal information. When the discovery information request is received from the user terminal, the transmitter transmits the discovery signal information to the user terminal.

In the network apparatus according to the embodiment, the transmitter transmits, to the another user terminal, transmission permission information permitting transmission of the discovery signal under a predetermined condition. The transmitter transmits, as the discovery signal information, the transmission permission information, to the user terminal.

In the network apparatus according to the embodiment, the discovery signal information includes information indicating a timing at which the another user terminal transmits the discovery signal and/or assignment information on a radio resource used for transmitting the discovery signal of the another user terminal.

[Embodiment]
(LTE System)

Figure 1:
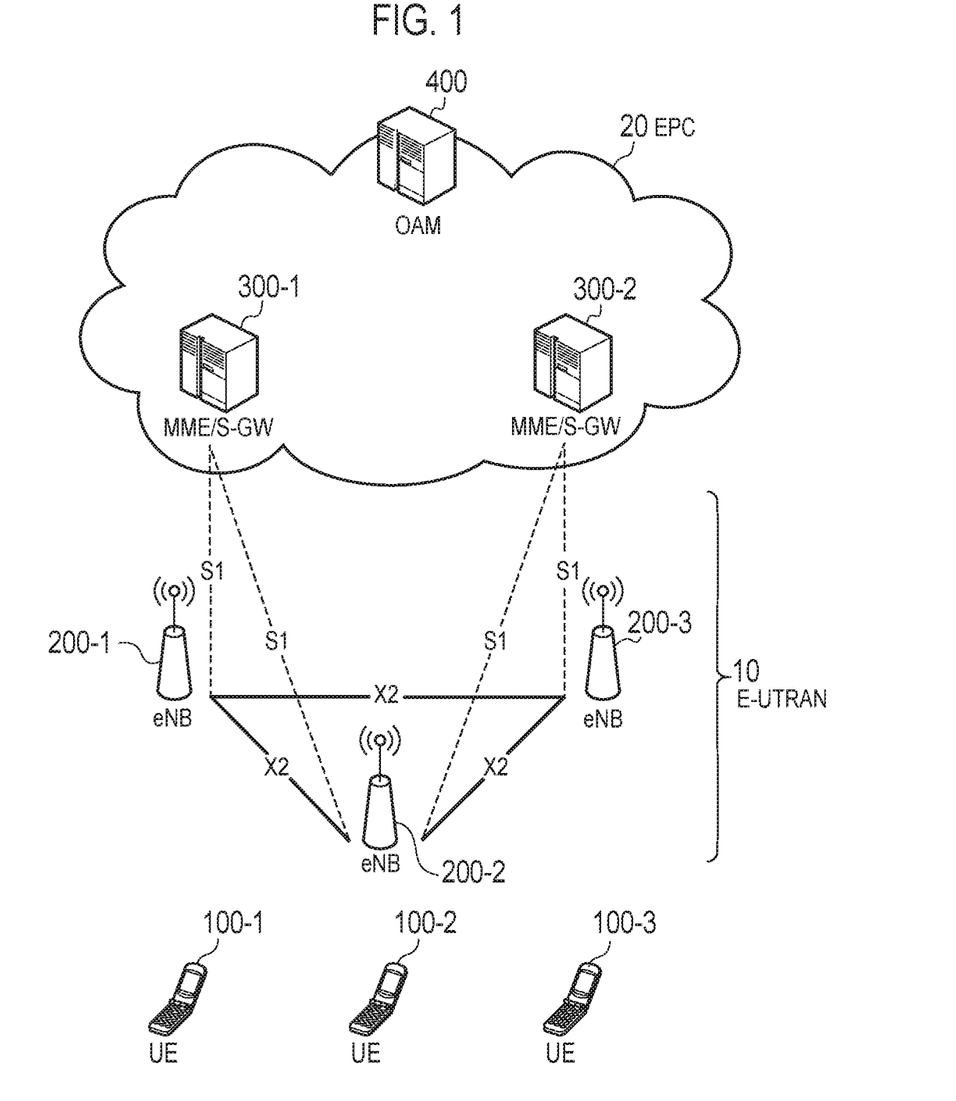
FIG. 1 is a configuration diagram of an LTE system.

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication apparatus and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell. As the same meaning, the connection between the cell managed by the eNB 200 and the UE 100 may be mentioned, where necessary, as the connection between the eNB 200 and the UE 100.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400. Further, the EPC 20 corresponds to a core network.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
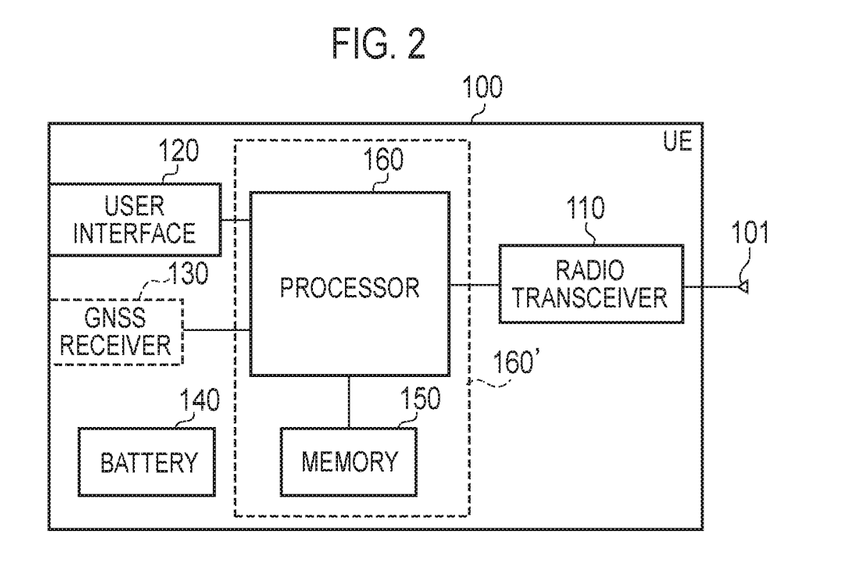
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

The UE 100 may not have the GNSS receiver 130. It is noted that the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
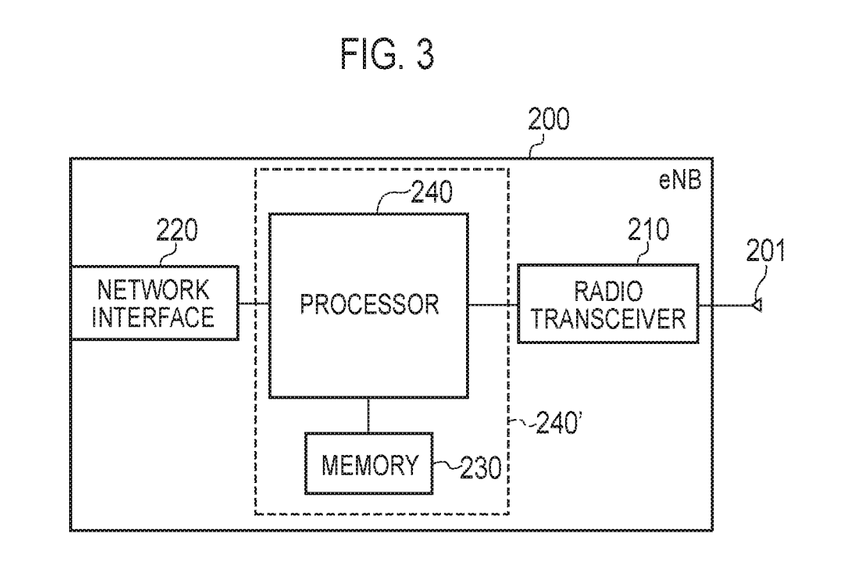
FIG. 3 is a block diagram of an eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller. It is noted that the memory 230 may be integrally formed with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
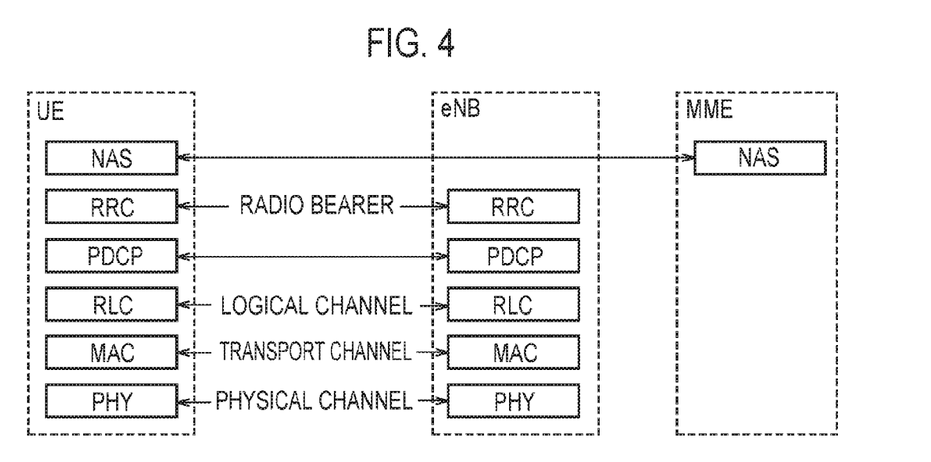
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by use of a physical channel. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

Figure 5:
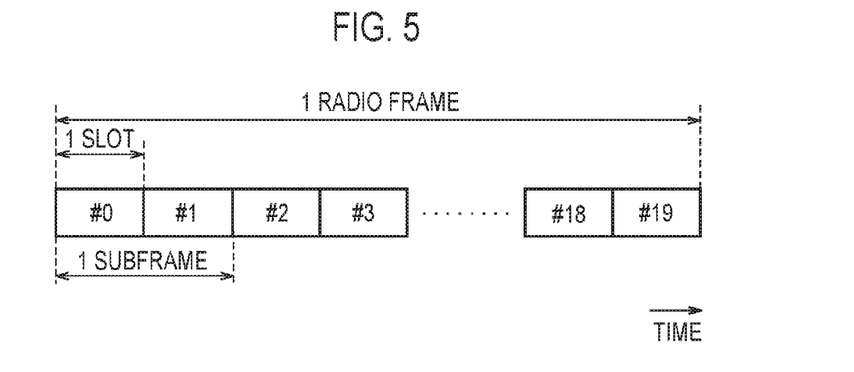
FIG. 5 is a configuration diagram of a radio frame used in the LTE system.

FIG. 5 is a configuration diagram of a radio frame used in the LTE system. In the LTE system, OFDMA (Orthogonal Frequency Division Multiple Access) is used in a downlink, and SC-FDMA (Single Carrier Frequency Division Multiple Access) is used in an uplink.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, cell-specific reference signals (CRSs) are distributed and arranged in each subframe.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH). Furthermore, demodulation reference signal (DMRS) and sounding reference signal are arranged in each subframe.

(D2D Communication)

Next, a description is given with comparing the D2D communication with the normal communication (the cellular communication) in the LTE system.

Figure 6:
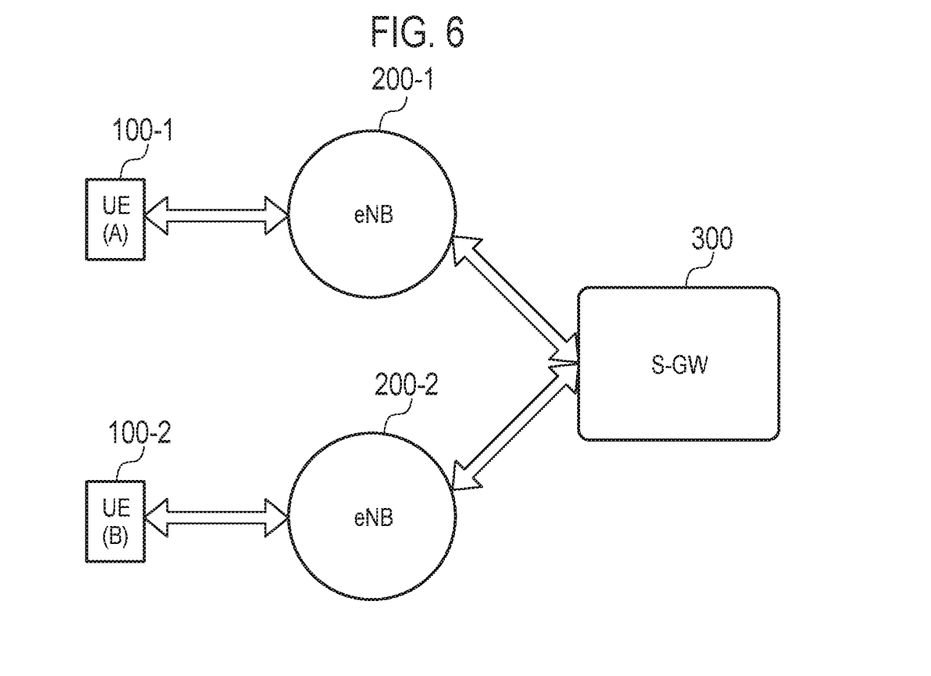
FIG. 6 is a diagram showing a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication goes through a network. Specifically, the data path is set to pass through the eNB 200-1, the S-GW 300, and the eNB 200-2.

Figure 7:
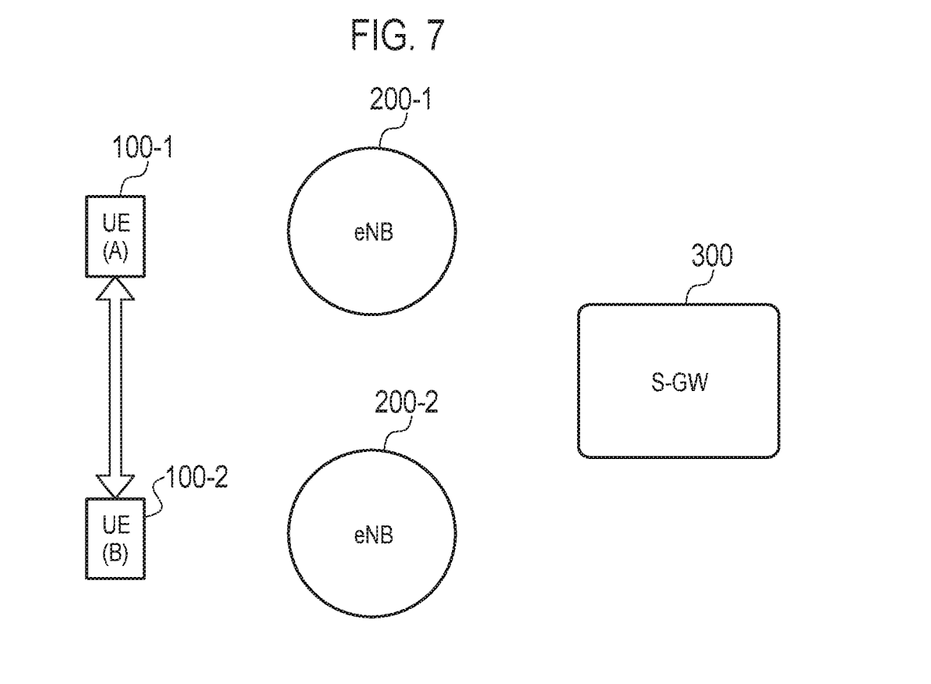
FIG. 7 is a diagram showing a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not go through a network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts.

On the other hand, in the above-described case (b), for example, the UE 100 starts announcing of a signal for the D2D communication by broadcast. Thus, the UE 100 is capable of starting the D2D communication regardless of the existence of the discovery of a partner terminal.

(Overview of Operations of Mobile Communication System)

Figure 8:
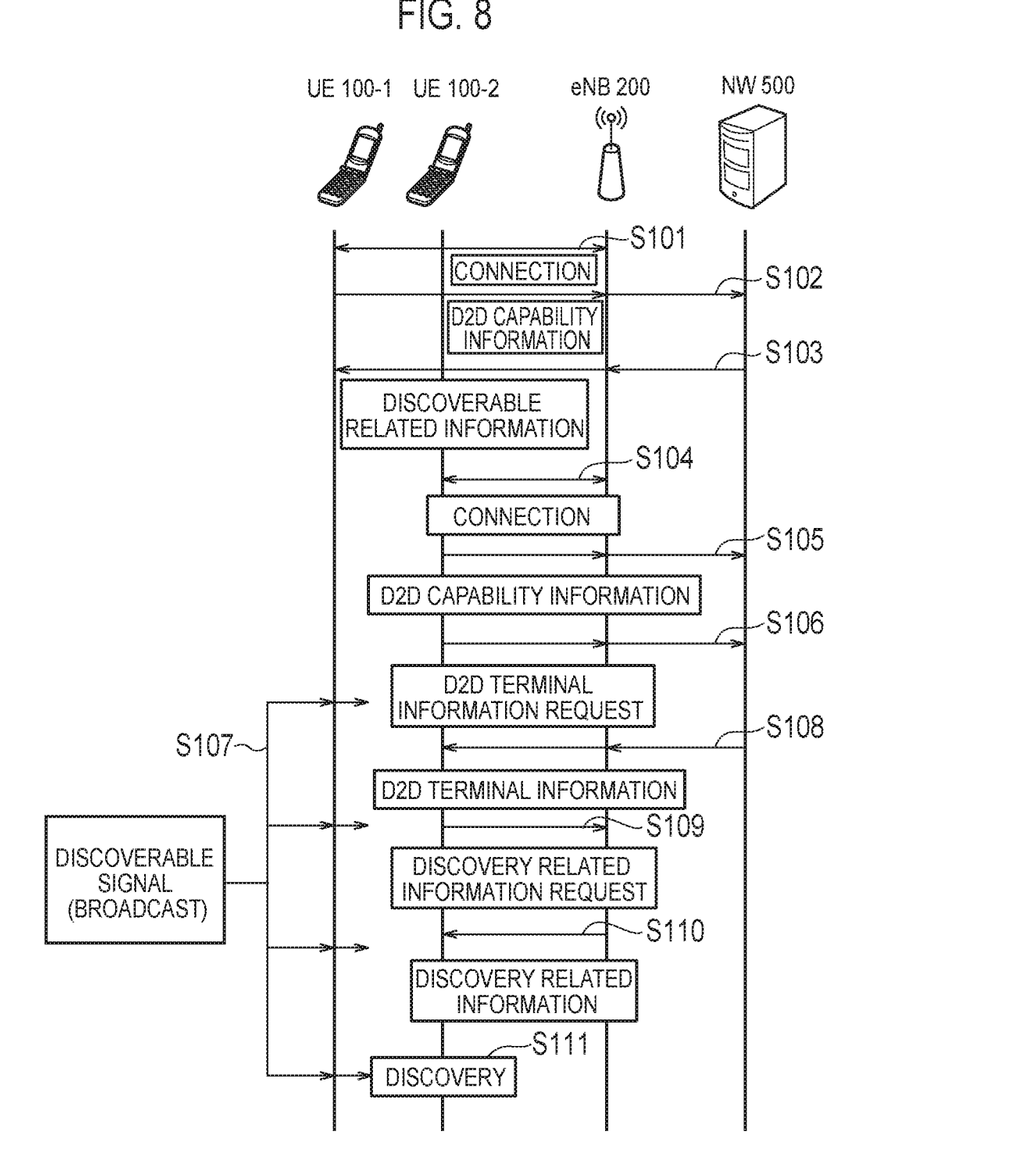
FIG. 8 is a sequence diagram showing an operation example of the mobile communication system according to the present embodiment.
Figure 9:
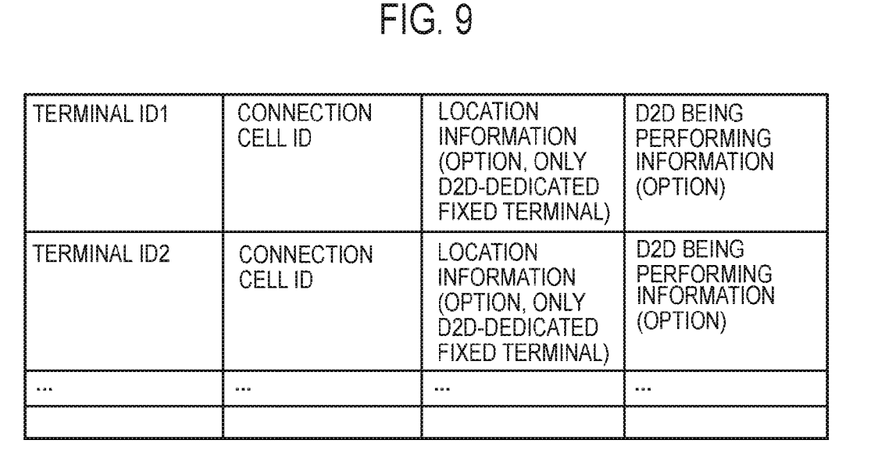
FIG. 9 is a diagram showing an example of a D2D management list according to the present embodiment.

Next, an overview of operations of the mobile communication system according to the present embodiment will be described by using FIG. 8 and FIG. 9. FIG. 8 is a sequence diagram showing an operation example of the mobile communication system according to the present embodiment. FIG. 9 is a diagram showing an example of a D2D management list according to the present embodiment.

As shown in FIG. 8, the mobile communication system according to the present embodiment has the UE 100-1, the UE 100-2, the eNB 200, and an NW 500 (network apparatus).

Each of the UE 100-1 and the UE 100-2 does not establish a connection with the eNB 200. That is, each of the UE 100-1 and the UE 100-2 is in an idle state.

The UE 100-1 is a terminal that distributes information by D2D communication. In the present embodiment, the UE 100-1 is a D2D communication dedicated terminal, and is a kiosk terminal installed on the street or in the shop, for example. However, the UE 100-1 (that is, the D2D communication dedicated terminal) may be capable of connecting to a management server, etc., via a network. The UE 100-1 has an MTC (Machine Type Communication) function that is a communication function for a small-type module.

Further, the UE 100-1 transmits a discovery signal used for discovering a proximity terminal. In the present embodiment, the discovery signal is a signal (Discoverable signal) by which the UE 100 that transmits the discovery signal (for example, the UE 100-1) is discovered by another UE 100 (for example, the UE 100-2). The discovery signal may be a reference signal for D2D communication, a beacon signal, or a pilot signal.

The NW 500 manages a UE 100 capable of performing D2D communication. Specifically, the NW 500 manages a location of a UE 100 capable of performing D2D communication. In the present embodiment, the NW 500 stores a D2D management list, as shown in FIG. 9.

In the present embodiment, in the D2D management list, an "identifier of a UE 100 (terminal ID) capable of performing the D2D communication", an "identifier of a cell connected by a UE 100 capable of performing the D2D communication (connection cell ID)", "location information of a UE 100 capable of performing the D2D communication (location information)", and "information indicating whether or not a UE 100 capable of performing the D2D communication is being performing the D2D (D2D being performing information)" are recorded. It is noted that the location information and the D2D being performing information may be optional, and the location information may be recorded for only a fixed terminal which is used exclusively for the D2D communication and of which the location is fixed.

As shown in FIG. 8, in step S101, the UE 100-1 establishes a connection with the eNB 200.

In step S102, the UE 100-1 transmits D2D capability information (D2D capability information), via the eNB 200, to the NW 500. The NW 500 receives the D2D capability information. When receiving the D2D capability information from the UE 100-1, the NW 500 recognizes that the UE 100-1 is capable of performing the D2D communication.

The D2D capability information is information indicating that the D2D communication is possible. Examples of the D2D capability information include: (a) information indicating that the UE 100 is capable of performing the D2D communication using an uplink and a downlink in all the bands supporting the cellular communication (D2D capability); (b) information indicating that the UE 100 is capable of performing the D2D communication using the uplink and/or the downlink in all the bands supporting the cellular communication (D2D capability per UL/DL); (c) information indicating that the UE 100 is capable of performing the D2D communication using the uplink and the downlink in a predetermined band (D2D capability per band); (d) information indicating that the UE 100 is capable of performing the D2D communication using the uplink and/or the downlink in a predetermined band (D2D capability per band+UL/DL); and (e) information indicating that the UE 100 is capable of performing the D2D communication using the uplink and/or the downlink in a predetermined band of the uplink and/or a predetermined band of the downlink (D2D capability per UL/DL per band). Thus, the D2D capability information may include information for designating a frequency band in which the D2D communication is possible.

The D2D capability information may be notified to the eNB 200 by using the UE Capability Information. Further, for the D2D capability information, a new FGI bit may be defined. Moreover, the D2D capability information may be included in UE EUTRA Capability.

Further, the D2D capability information may include fixation information indicating that the UE 100-1 is a fixed terminal. Examples of the fixation information include information indicating that the UE 100-1 has an MTC function and information indicating that the UE 100-1 is a DC supply.

It is noted that in step S101, when establishing a connection with the eNB 200, the UE 100-1 may transmit the D2D capability information.

In step S103, the NW 500 transmits Discoverable related information (transmission permission information) that permits transmission of the discovery signal under a predetermined condition, via the eNB 200, to the UE 100-1. The UE 100-1 receives the Discoverable related information.

The predetermined condition is defined by a transmission timing of the permitted discovery signal and/or a radio resource permitted to be used for transmission of the discovery signal, for example. The Discoverable related information includes at least one of timing information indicating a transmission timing of a permitted discovery signal and radio resource information of a radio resource permitted to be used for transmission of a discovery signal. The radio resource information may include frequency information available for transmission of a discovery signal and frame format information (FDD/TDD).

The NW 500 may transmit the Discoverable related information by unicast to only the UE 100 that has transmitted the D2D capability information, and may also transmit the same to all the UEs 100 existing in the cell managed by the eNB 200.

It is noted that the NW 500 may use an NAS signal to transmit the Discoverable related information, via the eNB 200, to the UE 100, and the eNB 200 that has received the Discoverable related information from the NW 500 may use a higher layer AS signal to transmit the information to the UE 100 by broadcast or by unicast. It is noted that D2D terminal information described later also may be transmitted in much the same way as in the Discoverable related information.

In step S104, the UE 100-2 establishes the connection with the eNB 200.

In step S105, the UE 100-2 transmits the D2D capability information, via the eNB 200, to the NW 500. The NW 500 receives the D2D capability information.

In step S106, the UE 100-2 transmits D2D terminal information request (terminal information request) to request the D2D terminal information, via the eNB 200, to the NW 500. The NW 500 receives the D2D terminal information request. The D2D terminal information will be described later.

The D2D terminal information request may include location information indicating a location of the current UE 100.

When coming closer to a location where the UE 100-2 performed the D2D communication in the past, for example, the UE 100-2 transmits the D2D terminal information request to the NW 500. Specifically, when determining, on the basis of a current location information and a location information included in an access history of the past D2D communication, that the UE 100-2 is located around the UE 100 that performed the D2D communication in the past, the UE 100-2 transmits the D2D terminal information request.

Alternatively, the UE 100-2 may transmit the D2D terminal information request when determining that a UE 100 capable of performing the D2D communication is present around the UE 100, on the basis of a list acquired in the past about the location information of a fixed terminal which is capable of performing the D2D communication and of which the location is fixed.

Further, the UE 100-2 may display, on a user interface 120, the information on the UE 100 which performs the D2D communication in the past and which is located in the neighborhood, before transmitting the D2D terminal information request. When a UE 100 to which a user desirably connects (for example, the UE 100-2) is input, the D2D terminal information request may be transmitted.

On the other hand, when receiving the D2D terminal information request from the UE 100-2, the NW 500 determines whether or not the UE 100-2 is located around another UE 100 that distributes information by the D2D communication. For example, when a distance between the location of the UE 100-2 and the location of the other UE 100 is equal to or less than a threshold value indicating that the D2D communication is possible, the NW 500 may determine that the UE 100-2 is located around the other UE 100. Alternatively, the NW 500 may determine that a UE 100 present in the same cell as the cell to which the UE 100 connects, as a UE 100 located around the UE 100-2.

When determining that the UE 100-2 is located around the other UE 100, the NW 500 transmits the D2D terminal information to the UE 100-2. Only when receiving the D2D capability information from the UE 100-2, the NW 500 may transmit the D2D terminal information to the UE 100-2.

In steps S107, the UE 100-1 starts transmitting the Discoverable signal, on the basis of the Discoverable related information. In the present embodiment, the UE 100-1 transmits the Discoverable signal by broadcast in a predetermined period, on the basis of timing information included in the Discoverable related information.

In step S108, the NW 500 transmits the D2D terminal information request, via the eNB 200, to the UE 100-2, in response to reception of the D2D terminal information request. The UE 100-2 receives the D2D terminal information.

The D2D terminal information is information on a UE 100 located around the UE 100-2. The D2D terminal information is used, by the UE 100-2, for determining whether or not to perform control for discovering a partner terminal in the D2D communication.

The D2D terminal information is information allowing a content distributed by the other UE 100 located around the UE 100-2 to be known (such as a content to be distributed), and location information of the other UE 100 located around the UE 100-2, for example. The NW 500 may acquire these pieces of information from the UE 100 and may acquire by inquiring the management server.

When the D2D capability information includes information for designating a frequency band in which the UE 100-2 is capable of performing the D2D communication, the NW 500 may transmit, to the UE 100-2, the D2D terminal information on only the UE 100 capable of performing the D2D communication by use of the frequency band designated by the information. That is, the NW 500 may not need to transmit to the UE 100-2 the D2D terminal information on the UE 100 capable of performing the D2D communication only in a frequency band in which the UE 100-2 is not capable of performing the D2D communication.

Further, the NW 500 may transmit the D2D terminal information on a UE 100 of which the location is fixed, out of UEs 100 located around the UE 100-2.

On the other hand, the UE 100-2 determines, on the basis of the D2D terminal information, to perform control for discovering another UE 100 located around the UE 100-2.

For example, when the D2D terminal information includes information on the distribution of the other UE 100 (an identifier of an application used for the distribution), the UE 100-2 determines whether or not to perform the control, on the basis of the D2D terminal information and the information previously registered in the UE 100-2 (an identifier of an application available for the UE 100-2, for example). In this case, when the identifier of the application used for the distribution and the identifier of the application available for the UE 100-2 match, the UE 100-2 may determine to perform the control. Further, the UE 100-2 may also determine to perform the control on the basis of a signal input by a user who recognizes the content to be distributed. Further, when the distance between the UE 100-2 and the other UE 100 is within a predetermined value indicating proximity, by the location information of the other UE 100 and the current location information, the UE 100-2 may determine to perform the control.

In the present embodiment, description proceeds with an assumption that the information on the UE 100-2 is included in the D2D terminal information and the UE 100-2 determines to perform the control for discovering the UE 100-1.

In the present embodiment, when determining to perform the control, the UE 100-2 performs a process in step S109.

In step S109, the UE 100-2 transmits, to the eNB 200, a Discovery related information request (discovery information request) for requesting the Discovery related information (discovery signal information) on the discovery signal transmitted by the other UE 100. The eNB 200-2 receives the Discovery related information request.

The Discovery related information request may include an identifier of the UE 100-1 desired, as a D2D communication partner, by the UE 100-2.

In step S110, the eNB 200 transmits the Discovery related information to the UE 100-2, in response to reception of the Discovery related information request. The UE 100-2 receives the Discovery related information.

The Discovery related information includes information indicating a timing at which the other UE 100 transmits the discovery signal and/or assignment information of the radio resource used for transmitting the discovery signal of the other UE 100. The Discovery related information may be similar in content to the above-described Discoverable related information. That is, the eNB 200 may transmit, as the Discovery related information, the Discoverable related information.

The eNB 200 transmits, to the UE 100-2, the Discovery related information only on the UE 100-1 desired, as a D2D communication partner, by the UE 100-2.

It is noted that the eNB 200 may use a higher layer AS signal to transmit the Discovery related information to the UE 100.

In step S111, the UE 100-2 performs the control for discovering the UE 100-1. Specifically, on the basis of the Discovery related information, the UE 100-2 performs the control for receiving the Discoverable signal transmitted from the UE 100-1. When receiving the Discoverable signal, the UE 100-2 determines to discover the UE 100-1. When the UE 100-2 transmits, to the UE 100-1, a response signal to the Discoverable signal, the UE 100-1 determines to have been discovered by the UE 100-2. Thereafter, the UE 100-1 and the UE 100-2 start the D2D communication. The UE 100-2 receives the information distributed by the UE 100-1.

(Summary of Embodiment)

In the present embodiment, when the UE 100-2 is located around the UE 100-1 that distributes the information by the D2D communication, the NW 500 transmits the D2D terminal information on the UE 100-1, to the UE 100-2. The UE 100-2 receives the D2D terminal information from the NW 500. The UE 100-2 performs the control for discovering the UE 100-2, on the basis of the D2D terminal information. As a result, the UE 100-2 is prevented from performing the control for discovery when the partner terminal of the D2D communication is not present around the UE 100-2 because the UE 100-2 knows that the UE 100 capable of performing the D2D communication is present around the UE 100-2 itself. Therefore, it is possible to restrain a wasteful battery consumption.

In the present embodiment, the UE 100-2 transmits, to the NW 500, the D2D terminal information request for requesting the D2D terminal information. The NW 500 receives the D2D terminal information request from the UE 100-2. The NW 500 transmits, to the UE 100, the D2D terminal information, in response to reception of the D2D terminal information. As a result, the UE 100-2 can acquire the D2D terminal information when the D2D terminal information is needed. Thus, the UE 100-2, which does not receive the D2D terminal information when the D2D terminal information is not needed, is capable of restraining a wasteful battery consumption.

In the present embodiment, when coming closer to a location where the UE 100-2 performed the D2D communication in the past, the UE 100-2 can transmit, to the NW 500, the D2D terminal information request. As a result, the UE 100-2 is capable of confirming whether the UE 100 that performed the D2D communication with the UE 100-2 in the past is still present in the same location. Therefore, it is possible to restrain a wasteful battery consumption.

In the present embodiment, the UE 100-2 transmits the D2D capability information to the NW 500 before receiving the D2D terminal information. Only when having received the D2D capability information from the UE 100-2, the NW 500 transmits the D2D terminal information to the UE 100. As a result, the UE 100 not capable of performing the D2D communication is not considered as a target to which the D2D terminal information is transmitted, and thus, it is possible to effectively utilize the radio resource.

In the present embodiment, the D2D capability information includes information for designating a frequency band in which the UE 100 is capable of performing the D2D communication. When the D2D capability information includes the information for designating a frequency band in which the UE 100 is capable of performing the D2D communication, the NW 500 can transmit, to the UE 100-2, the D2D terminal information only on the UE 100 capable of performing the D2D communication by use of the frequency band designated by the information. As a result, the NW 500 may not need to transmit the D2D terminal information on the UE 100 not capable of performing the D2D communication with the UE 100-2, and thus, it is possible to effectively utilize the radio resource.

In the present embodiment, the NW 500 is capable of transmitting the D2D terminal information on a UE 100 of which the location is fixed, out of UEs 100 located around the UE 100-2. Thus, the location of the UE 100 of which the location is fixed is highly likely to be located at the same location indicated by the location information of the UE 100 stored in the D2D management list, and therefore, the reliability of the D2D related information is enhanced. As a result, when determining on the basis of the D2D related information whether to perform the control for the discovery, the UE 100-2 is capable of further restraining a wasteful battery consumption.

In the present embodiment, after transmitting the D2D terminal information, the NW 500 transmits the Discovery related information to the UE 100-2. After determining to perform the control for the discovery, the UE 100 receives the Discovery related information. On the basis of the Discovery related information, the UE 100 performs the control for receiving the Discoverable signal. Further, the Discovery related information includes information indicating a timing at which the UE 100-1 transmits the Discoverable signal and/or information indicating a radio resource used for transmitting the Discoverable signal of the UE 100-1. As a result, the UE 100-2 is capable of shortening a time in which the control for the discovery is performed. Therefore, it is possible to further restrain a wasteful battery consumption.

In the present embodiment, after receiving the D2D terminal information, the UE 100-2 transmits the Discovery related information request to the NW 500. When receiving the Discovery related information request after transmitting the D2D terminal information, the NW 500 transmits the Discovery related information to the UE 100-2. As a result, the NW 500 may not need to transmit the Discovery related information to the UE 100 that does not perform the D2D communication, and thus, it is possible to efficiently utilize the radio resource.

In the present embodiment, the NW 500 transmits, to the UE 100-1, the Discoverable related information by which the transmission of the Discoverable signal is permitted under a predetermined condition, and transmits, to the UE 100-2, the Discovery related information (the Discoverable related information in the present embodiment). As a result, the NW 500 is capable of controlling the transmission of the Discoverable signal of the UE 100-1, and the UE 100-2 is capable of shortening a time in which the control for the discovery is performed. Therefore, it is possible to further restrain a wasteful battery consumption.

[Other Embodiments]

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, in the above-described embodiment, the network apparatus that is the NW 500 is different from the eNB 200; however, the network apparatus may be the eNB 200. Further, the network apparatus may be an apparatus configuring the core network (for example, the MME) or a management server. Further, the eNB 200 may have a similar function to that of the network apparatus according to the embodiment, and may work together with another network apparatus to perform the control according to the above-described embodiment.

Further, in the above-described embodiment, the UE 100-1 transmits, as the discovery signal, the Discoverable signal; however, this is not limiting. For example, the UE 100-1 may transmit, as the discovery signal, a signal for discovering a partner terminal (Discovery signal). The UE 100-2 can discover the UE 100-1 in response to reception of the Discovery signal. The UE 100-1 can discover the UE 100-2 in response to reception of the Discovery signal from the UE 100-2.

Further, in the above-described embodiment, the UE 100-2 performs the control for receiving the Discoverable signal as the control for discovering the UE 100-1; however, this is not limiting. For example, the UE 100-2 may receive the Discovery signal transmitted from the UE 100-1 to discover the UE 100-1. Alternatively, the UE 100-2 may transmit the Discovery signal (or the Discoverable signal) and receive the response to the Discovery signal (or the Discoverable signal) from the UE 100-1 to discover the UE 100-1.

Further, in the above-described embodiment, the NW 500 transmits the D2D terminal information in response to reception of the D2D terminal information request; however, this is not limiting. For example, the NW 500 periodically or unperiodically determines whether or not each UE 100 connected to the cell is located around another UE 100 that distributes information by the D2D communication. When determining that the UE 100 is located around the other UE 100, the NW 500 may transmit the D2D terminal information.

Further, in the above-described embodiment, the eNB 200 transmits the Discovery related information in response to reception of the Discovery related information request; however, this is not limiting. For example, the eNB 200 may periodically or unperiodically transmit the Discovery related information. Further, the eNB 200 performs the control of the transmission of the Discovery related information; the NW 500 may also control the transmission of the Discovery related information. That is, when receiving the Discovery related information request via the eNB 200, the NW 500 may transmit the Discovery related information to the UE 100-2.

Further, in the above-described embodiment, after determining to perform the control for discovering another UE 100 located around the UE 100-2, the UE 100-2 transmits the Discovery related information request; however, this is not limiting. The UE 100-2 may perform the Discovery without transmitting the Discovery related information request after determining to perform the control.

Further, in the above-described embodiment, when the UE 100-1 is a terminal of which the movement is restricted (for example, a fixed terminal of which the location is fixed), the UE 100-1 may transmit the UE capability information which includes fixation information with an indication of a fixed terminal, to the NW 500. The NW 500 may update the D2D management list on the basis of the fixation information.

It is noted that the UE 100-2 may naturally perform the control for discovering the UE 100-1, for a purpose of communication, and in addition, irrespective of whether to perform the communication with the discovered partner, may perform the control for discovery solely for the purpose of discovering the UE 100-1 around the UE 100-2 itself.

It is noted that when the UE 100-2 comes close to the location where the UE 100-2 performed the D2D communication in the past, the UE 100-2 may perform the control of discovering another UE 100 on the basis of the Discovery related information as long as previously receiving the Discovery related information even though the UE 100-2 does not receive the D2D terminal information.

In the above-described embodiments, an example in which the present invention is applied to the LTE system has been described. However, the present invention may also be applied to systems other than the LTE system, as well as the LTE system.

It is noted that the entire content of Japanese Patent Application No. 2013-202765 (filed on Sep. 27, 2013) is incorporated in the present specification by reference.

INDUSTRIAL APPLICABILITY

As described above, the user terminal and the network apparatus according to the present invention can restrain wasteful battery consumption in D2D communication, thus they are useful in the mobile communication field.

The invention claimed is:

1. A network apparatus in a mobile communication system that supports Device-to-Device (D2D) communication that is direct device-to-device communication, comprising:
   a processor coupled to a memory and configured to:
   manage a location of a second user terminal configured to transmit information by the D2D communication;
   receive information indicating a location of a first user terminal from the first user terminal;
   determine whether a distance between the location of the first user terminal and the location of the second user terminal is equal to or less than a distance threshold value based on the location of the first user terminal indicated by the received information from the first user terminal and the managed location of the second user terminal; and
   detect that the first user terminal is located in proximity to the second user terminal on a basis of the determination; and
   a transmitter configured to transmit, to the first user terminal, D2D terminal information on the second user terminal located in proximity to the first user terminal, in response to detecting that the first user terminal is located in proximity to the second user terminal, wherein
   the transmitter is further configured to transmit, to the first user terminal, an identifier of an application available to the first user terminal in response to detecting that the first user terminal is located in proximity to the second user terminal.

2. The network apparatus according to claim 1, further comprising: a receiver configured to receive, from the first user terminal, a terminal information request for requesting the D2D terminal information, wherein the transmitter transmits the D2D terminal information to the first user terminal, in response to reception of the terminal information request.

3. The network apparatus according to claim 1, further comprising: a receiver configured to receive, from the first user terminal, D2D capability information indicating that the D2D communication is possible, wherein
   the transmitter transmits the D2D terminal information to the first user terminal only when the D2D capability information is received from the first user terminal.

4. The network apparatus according to claim 3, wherein when the D2D capability information includes information for designating a frequency band in which the first user terminal is capable of performing the D2D communication, the transmitter transmit, to the first user terminal, the D2D terminal information on only the second user terminal capable of performing the D2D communication by use of the frequency band designated by the information.

5. The network apparatus according to claim 1, wherein when a location of the second user terminal is fixed, the transmitter transmits, to the first user terminal, the D2D terminal information on the fixed second user terminal.

6. The network apparatus according to claim 1, wherein the transmitter transmits, after transmitting the D2D terminal information, to the first user terminal, discovery signal information on a discovery signal transmitted by the second user terminal so as to be discovered as a partner terminal of the D2D communication.

7. The network apparatus according to claim 6, further comprising: a receiver configured to receive, after transmitting the D2D terminal information, from the first user terminal, a discovery information request for requesting the discovery signal information, wherein
   when the discovery information request is received from the first user terminal, the transmitter transmits the discovery signal information to the first user terminal.

8. The network apparatus according to claim 6, wherein the transmitter transmits, to the second user terminal, transmission permission information permitting transmission of the discovery signal under a predetermined condition, and
   the transmitter transmits, as the discovery signal information, the transmission permission information, to the first user terminal.

9. The network apparatus according to claim 6, wherein the discovery signal information includes information indicating a timing at which the second user terminal transmits the discovery signal and/or assignment information on a radio resource used for transmitting the discovery signal of the second user terminal.

* * * * *